(12) United States Patent
Horng

(10) Patent No.: US 9,543,801 B2
(45) Date of Patent: Jan. 10, 2017

(54) MOTOR WITH THRUST BEARING

(71) Applicant: Sunonwealth Electric Machine Industry Co., Ltd., Kaohsiung (TW)

(72) Inventor: Alex Horng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 163 days.

(21) Appl. No.: 14/547,192

(22) Filed: Nov. 19, 2014

(65) Prior Publication Data
US 2015/0188387 A1 Jul. 2, 2015

(30) Foreign Application Priority Data
Dec. 31, 2013 (TW) ............... 102149281 A

(51) Int. Cl.
| | |
|---|---|
| H02K 7/08 | (2006.01) |
| H02K 5/10 | (2006.01) |
| H02K 5/167 | (2006.01) |
| F16C 17/04 | (2006.01) |
| G11B 19/20 | (2006.01) |
| F16C 43/02 | (2006.01) |
| F16C 17/10 | (2006.01) |
| F16C 33/10 | (2006.01) |

(52) U.S. Cl.
CPC ............. H02K 5/10 (2013.01); F16C 17/04 (2013.01); G11B 19/2009 (2013.01); H02K 5/1675 (2013.01); H02K 7/085 (2013.01); *F16C 17/107* (2013.01); *F16C 33/106* (2013.01); *F16C 43/02* (2013.01); *F16C 2370/12* (2013.01); *H02K 2205/03* (2013.01)

(58) Field of Classification Search
CPC ............................. H02K 5/1675; F16C 17/107
See application file for complete search history.

(56) References Cited

U.S. PATENT DOCUMENTS

| | | | |
|---|---|---|---|
| 7,005,768 B2* | 2/2006 | Tamaoka | F16C 17/02 310/67 R |
| 7,021,829 B2 | 4/2006 | Tamoaka | |
| 7,265,467 B2* | 9/2007 | Sumi | F16C 17/107 310/90 |
| 7,541,708 B2* | 6/2009 | Ishikawa | H02K 1/02 310/90 |

(Continued)

FOREIGN PATENT DOCUMENTS

| | | |
|---|---|---|
| TW | 200538651 A | 12/2005 |
| TW | I279062 B | 2/2007 |

*Primary Examiner* — Dang Le
(74) *Attorney, Agent, or Firm* — Alan D. Kamrath; Kamrath IP Lawfirm, P.A.

(57) ABSTRACT

A motor includes a bearing sleeve arranged with a base and having opposite opening and sealing ends; a stator coupled with the base or bearing sleeve; and a rotating member disposed in the bearing sleeve and including a shaft and a limiting portion adjacent to the sealing end. A first end of the shaft connects with the limiting portion, a second end of the shaft has a coupling portion, and the limiting portion has a first contact surface. A thrust bearing is arranged between the shaft and the bearing sleeve and has a second contact surface facing the first contact surface. At least one of the first and second contact surfaces is an uneven surface. A hub is coupled with the coupling portion of the shaft and has a permanent magnet corresponding to the stator.

18 Claims, 13 Drawing Sheets

(56) References Cited

U.S. PATENT DOCUMENTS

| | | | |
|---|---|---|---|
| 8,837,079 B1* | 9/2014 | Smirnov | H02K 5/1675 360/99.08 |
| 2005/0180668 A1 | 8/2005 | Yazawa | |
| 2012/0187789 A1* | 7/2012 | Noh | H02K 7/085 310/90 |

* cited by examiner

MOTOR WITH THRUST BEARING

BACKGROUND OF THE INVENTION

1. Field of the Invention

The present invention generally relates to a motor with a thrust bearing and, more particularly, to a motor capable of steady rotation.

2. Description of the Related Art

Referring to FIG. 1, a sketch diagram of a conventional motor with a thrust bearing is shown, which is identified with a reference number of "9" and which has a seat 91, a stator 92 and a rotor 93. The seat 91 is coupled with a bearing housing 911 receiving a thrust bearing 912 and a pushing board 913 inside. The bearing housing 911 has two opposite openings for the rotor 93 to extend into the thrust bearing 912 and to couple with a lid 914 respectively. The stator 92 is coupled with an outer periphery of the seat 91. The rotor 93 includes a hub 931 integrally forming an annular wall 932 and a shaft 933. The annular wall 932 is located between the seat 91 and the bearing housing 911, to provide functions such as dust-resistance and anti-leakage of oil. The shaft 933 extends through the thrust bearing 912 and couples with the pushing board 913. Specifically, this kind of motor 9 is disclosed in patents such as a China patent application with the application number of 200410054614.4 (which is US Pat. No. 7,021,829) and title of "Fluid-Dynamic-Pressure Bearing, Spindle Motor Furnished with the Fluid-Dynamic-Pressure Bearing, Method of Manufacturing Rotor Assembly Applied in the Spindle Motor, and Recording-Disk Drive Furnished with the Spindle Motor."

With the above structure, in rotation of the rotor 93 relative to the thrust bearing 912, an upper surface of the pushing board 913 abuts against the thrust bearing 912 with a large area "F" since this upper surface contacts with a lower surface of the thrust bearing 912. As a result, in operation of the rotor 93, friction between the pushing board 913 and the thrust bearing 912 is large, which affects the rotation of the rotor 93 significantly. Therefore, it is necessary to improve the conventional motor 9.

SUMMARY OF THE INVENTION

What is needed is a motor with a thrust bearing, which has a small interface area between a rotating member and a thrust bearing, to ensure a smooth and stable operation of the motor.

In one implementation, a motor with a thrust bearing includes: a base; a bearing sleeve arranged with the base and having an opening end and a sealing end, with the opening and sealing ends opposite to each other; a stator coupled with the base or the bearing sleeve; a rotating member disposed in the bearing sleeve and comprising a shaft and a limiting portion, with a first end of the shaft connecting with the limiting portion, a second end of the shaft having a coupling portion, and the limiting portion having a first contact surface; a thrust bearing arranged between the shaft and an inner surface of the bearing sleeve, so that the limiting portion is between the thrust bearing and the sealing end, with the thrust bearing having a second contact surface facing the first contact surface, and at least one of the first contact surface and the second contact surface being an uneven surface; and a hub coupled with the coupling portion of the shaft and having a permanent magnet corresponding to the stator.

In this implementation, one or more of the following features may be included: an interface between the first contact surface and the second contact surface is in point contact or line contact; the first contact surface has a plurality of annular protrusions contacting with the second contact surface; each of the annular protrusions has an abutting line in a circular shape and contacts with the second contact surface by the abutting line only, to provide the line contact between the first and second contact surfaces; the first contact surface has a plurality of dot protrusions contacting with the second contact surface; each of the dot protrusions has an abutting point and contacts with the second contact surface by the abutting point only, to provide the point contact between the first and second contact surfaces; the first contact surface is an arc surface contacting with the second contact surface; the arc surface has an abutting line in a circular shape and contacts with the second contact surface by the abutting line only, to provide the line contact between the first and second contact surfaces; the second contact surface has a plurality of annular protrusions contacting with the first contact surface; each of the annular protrusions has an abutting line in a circular shape and contacts with the first contact surface by the abutting line only, to provide the line contact between the first and second contact surfaces; the second contact surface has a plurality of dot protrusions contacting with the first contact surface; each of the dot protrusions has an abutting point and contacts with the first contact surface by the abutting point only, to provide the point contact between the first and second contact surfaces; the second contact surface is an arc surface contacting with the first contact surface; the arc surface has an abutting line in a circular shape and contacts with the first contact surface by the abutting line only, to provide the line contact between the first and second contact surfaces; the coupling portion is close to the opening end and away from the sealing end as well as the limiting portion is close to the sealing end and away from the opening end; the. Limiting portion has an arc surface facing and abutting against the sealing end of the bearing sleeve; a surface of the sealing end inside the bearing sleeve has a plurality of supports, and an end of the thrust bearing abuts against the supports; a surface of the sealing end inside the bearing sleeve has a plurality of supports, and the limiting portion abuts against the supports; a surface of the thrust bearing has a plurality of supports abutting against the sealing end; the base has a connecting portion, a plate and a tube, with the connecting portion arranged with the bearing sleeve, the tube arranged at a center part of the plate and having an axial hole extending through the tube axially, the connecting portion of the base being the axial hole of the tube, and the stator coupled with an outer periphery of the tube; the base has a plate, the bearing sleeve is a shaft tube integrally formed with the plate, and the stator is coupled with an outer surface of the shaft tube; an inner sleeve is arranged inside the shaft tube and has a radial protrusion between the thrust bearing and the sealing end; the inner sleeve is integrally formed with the shaft tube; a gap is formed between the limiting portion and the thrust bearing; an inner surface of the tube has a radial recess, a surface of the hub has an annular flange extending into the tube and corresponding to the radial recess, and the annular flange is located between the radial recess and the bearing sleeve; in radial directions of the rotating member, each of the shaft and the limiting portion has a maximum outer diameter, and the maximum outer diameter of the limiting portion is larger than the maximum outer diameter of the shaft; and the base and the bearing sleeve are integrally formed with each other as a single piece.

BRIEF DESCRIPTION OF THE DRAWINGS

The present invention will become more fully understood from the detailed description given hereinafter and the accompanying drawings which are given by way of illustration only, and thus are not limitative of the present invention, including.

Figure 1:
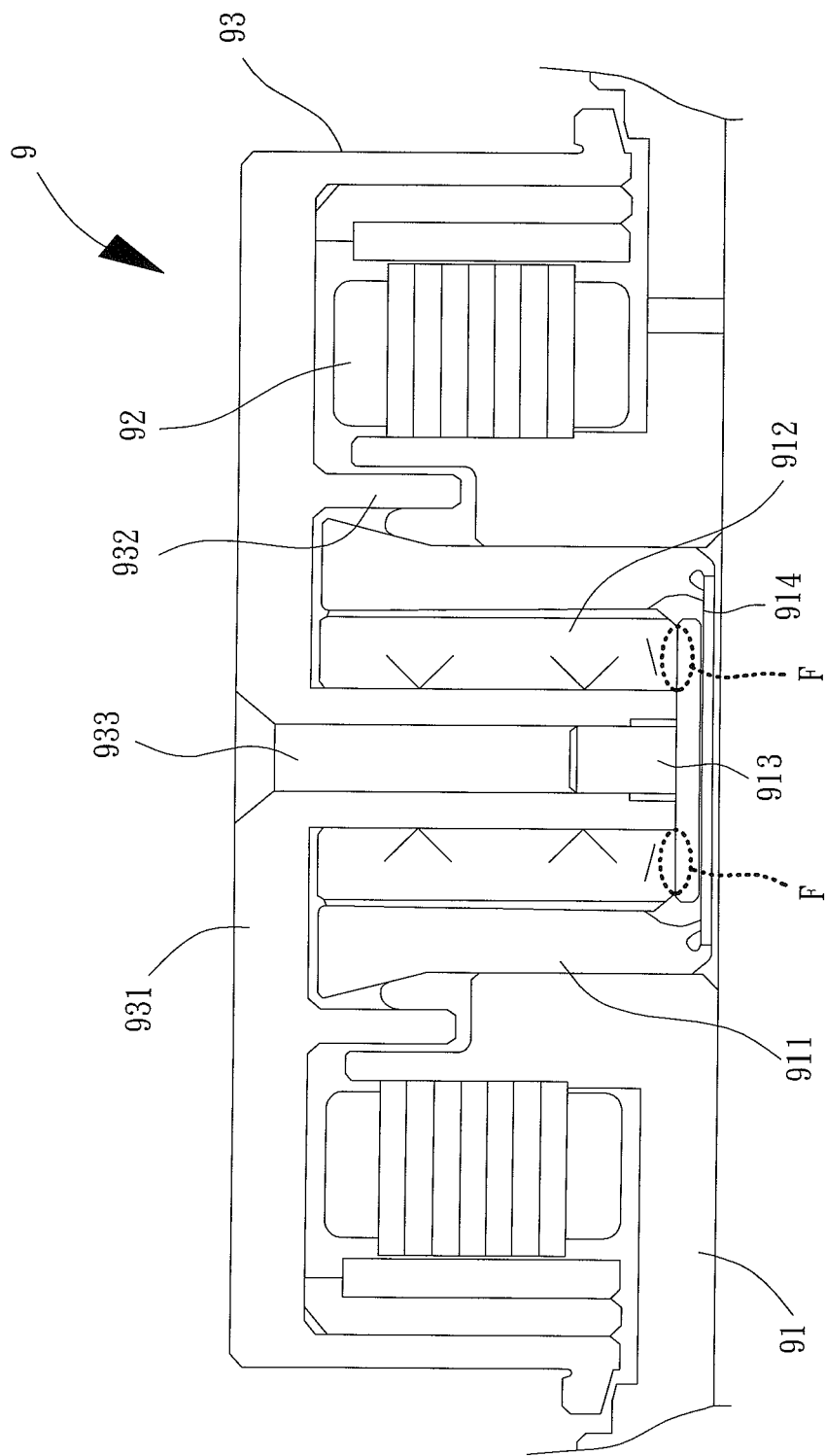
FIG. 1 is a sketch diagram of a conventional motor a with thrust bearing.

In the various figures of the drawings, the same numerals designate the same or similar parts. Furthermore, when the term "first," "second," "inner," "outer" and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

Figure 2:
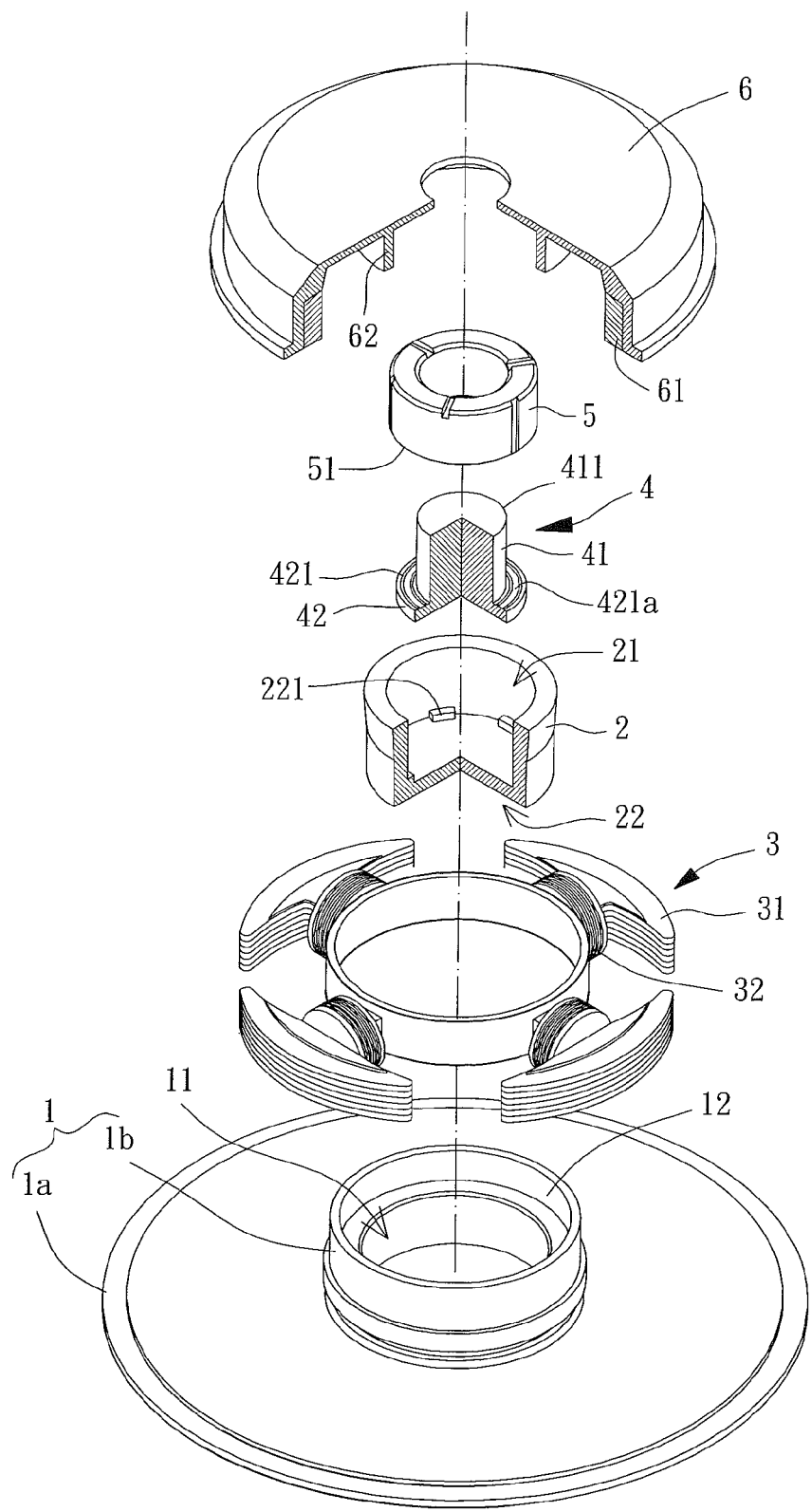
FIG. 2 is an explosive and perspective view of a motor with a thrust bearing according to a preferable embodiment of the present disclosure.
Figure 3:
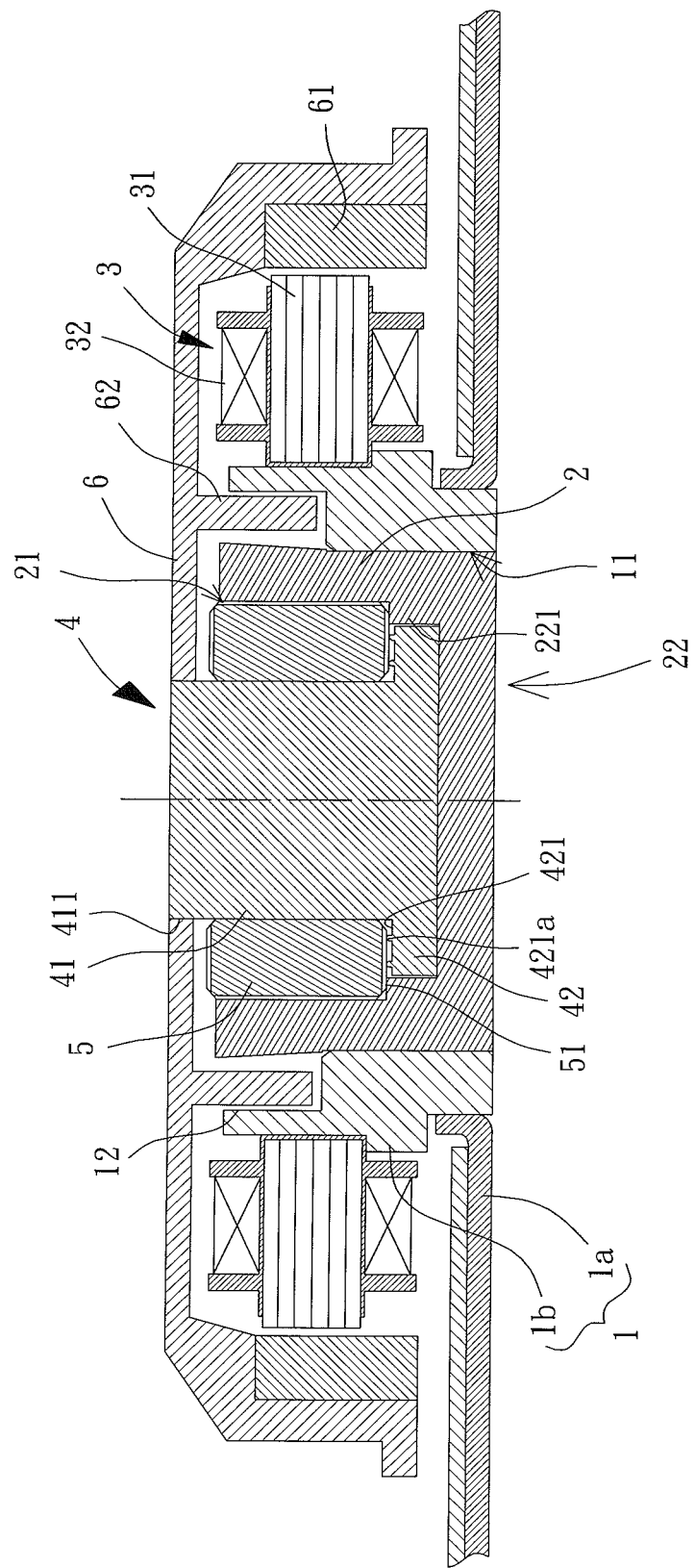
FIG. 3 is a cross-sectional view of the motor with the thrust bearing of the preferable embodiment.

Referring to FIGS. 2 and 3, a preferred embodiment of a motor with a thrust bearing of the present invention is shown, which includes a base 1, a bearing sleeve 2, a stator 3, a rotating member 4, a thrust bearing 5, and a hub 6. The bearing sleeve 2 and the stator 3 are arranged with the base 1, the bearing sleeve 2 receives the rotating member 4 and the thrust bearing 5, and the hub 6 is coupled with the rotating member 4.

Specifically, the base 1 has a connecting portion 11 for arrangement of the bearing sleeve 2. Furthermore, the base 1 may include a plate 1*a* and a tube 1*b*. The tube 1*b* is arranged at a center part of the plate 1*a* and has an axial hole extending through the tube 1*b* axially. The connecting portion 11 of the base 1 is the axial hole of the tube 1*b* through which the bearing sleeve 2 can extend.

Figure 19:
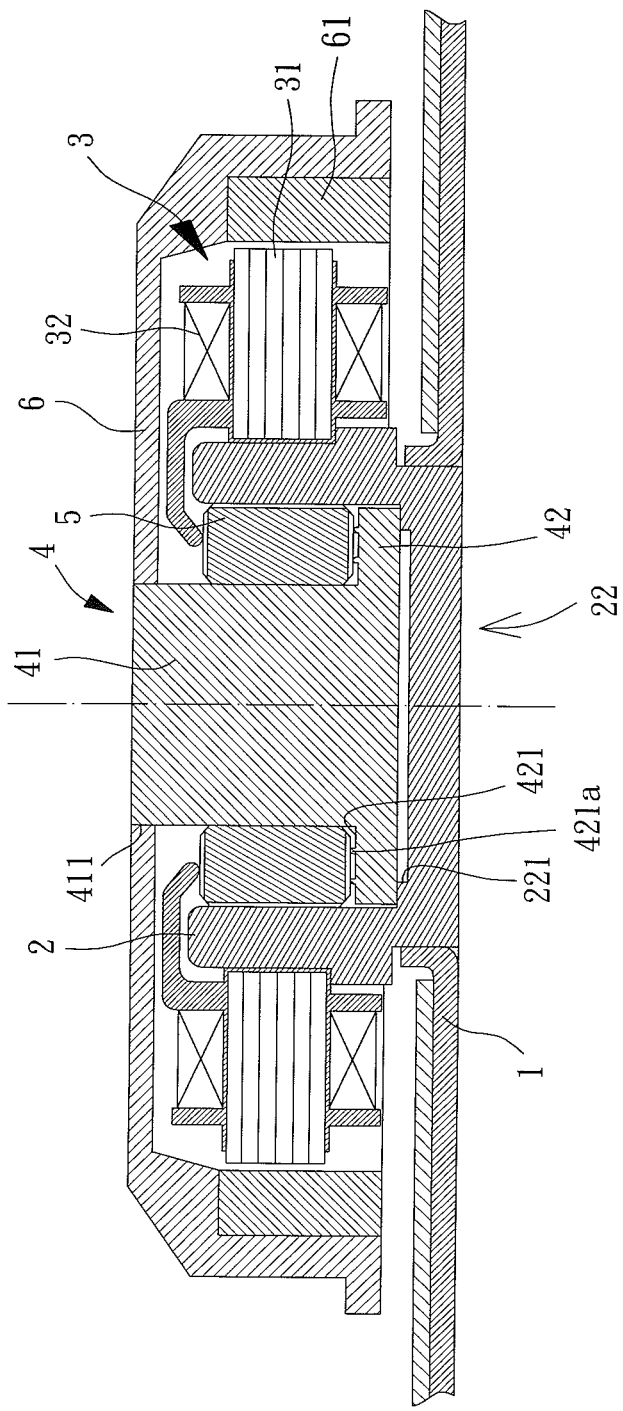
FIG. 19 is a cross-sectional view of the motor with the thrust bearing of the preferable embodiment, with the sealing end of the bearing sleeve having a plurality of supports.

The bearing sleeve 2 is coupled with the connecting portion 11 of the base 1 and can be of any structure capable of receiving the rotating member 4 and the thrust bearing 5. The bearing sleeve 2 has an opening end 21 and a sealing end 22, with the sealing end 22 coupled to the connecting portion 11 of the base 1. The sealing end 22 may connect with a periphery wall of the bearing sleeve 2 integrally; alternatively, the sealing end 22 may be formed by coupling a lid to an end opening of the periphery wall opposite to the opening end 21. Preferably, a surface of the sealing end 22 inside the bearing sleeve 2 has a plurality of supports 221 to support the thrust bearing 5 or to support the rotating member 4 as shown in FIG. 19 for a smooth rotation of the rotating member 4. Alternatively, the supports 221 may be arranged on a surface of the thrust bearing 5 to abut against the sealing end 22. Furthermore, in order to simplify the structure of the present disclosed motor, the bearing sleeve 2 and the base 1 can be integrally formed with each other as a single piece.

The stator 3 is coupled with one of the base 1 and the bearing sleeve 2 and is in a structure for driving the hub 6. Preferably, the stator 3 is arranged around the tube 1*b* and coupled with an outer periphery of the tube 1*b*. The stator 3 includes a silicon steel member 31 and a coil 32 winding around the silicon steel member 31. The silicon steel member 31 can be in the form of a pile of silicon steel plates or a single silicon steel plate.

The rotating member 4 is disposed in the bearing sleeve 2 and includes a shaft 41 and a limiting portion 42, the limiting portion 42 is integrally formed at or detachably connects to a first end of the shaft 41, and a second end of the shaft 41 has a coupling portion 411. Specifically, the limiting portion 42 has a first contact surface 421, and the shaft 41 extends toward the opening end 21 from the first contact surface 421. Particularly, in radial directions of the rotating member 4, which are perpendicular to an axial direction of the rotating member 4, each of the shaft 41 and the limiting portion 42 has a maximum outer diameter, and the maximum outer diameter of the limiting portion 42 is preferably larger than that of the shaft 41.

The thrust bearing 5 is also disposed in the bearing sleeve 2 and between the shaft 41 and an inner surface of the bearing sleeve 2. Therefore, with the thrust bearing 5, the rotating member 4 can stably rotate inside the bearing sleeve 2. Besides, the limiting portion 42 can extend into a gap between the thrust bearing 5 and the sealing end 22 and can be axially positioned therein since the maximum outer diameter of the limiting portion 42 is preferably larger than that of the shaft 41. Therefore, the rotating member 4 does not easily fall out of the bearing sleeve 2. The thrust bearing 5 has a second contact surface 51 facing the first contact surface 421 of the limiting portion 42. At least one of the first contact surface 421 and the second contact surface 51 is not flat, so that a contact area between the first and second contact surfaces 421, 51 is small.

Figure 4:
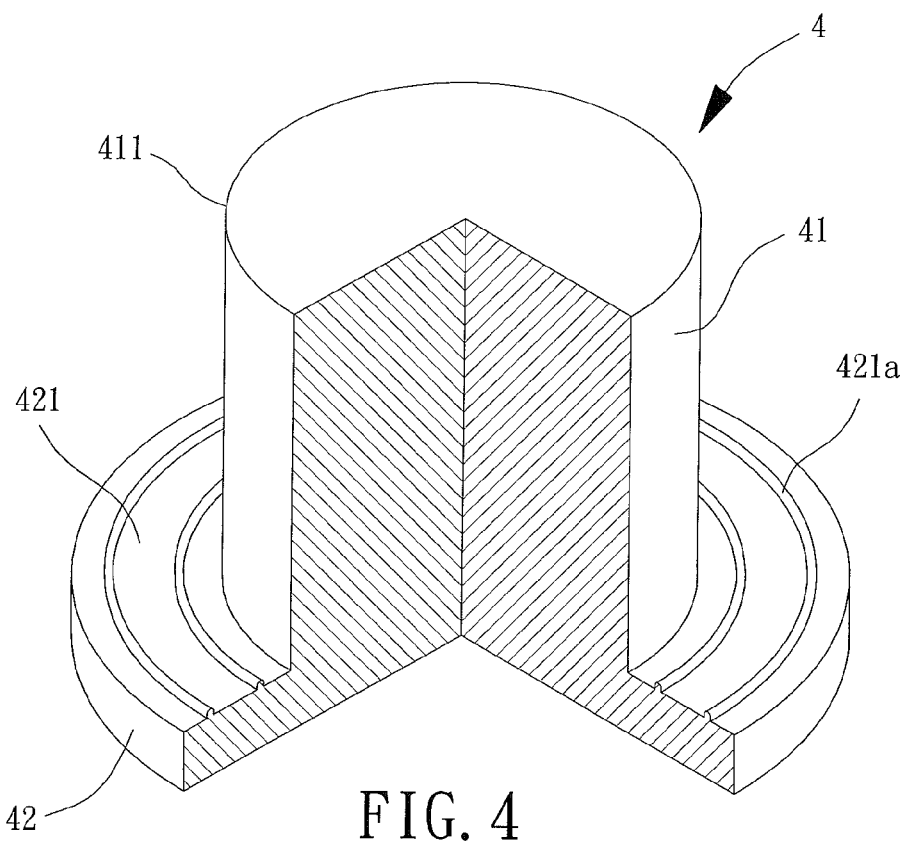
FIG. 4 is a perspective view of a rotating member of the motor with the thrust bearing of the preferable embodiment, with the rotating member including a limiting portion having a plurality of annular protrusions.
Figure 5:
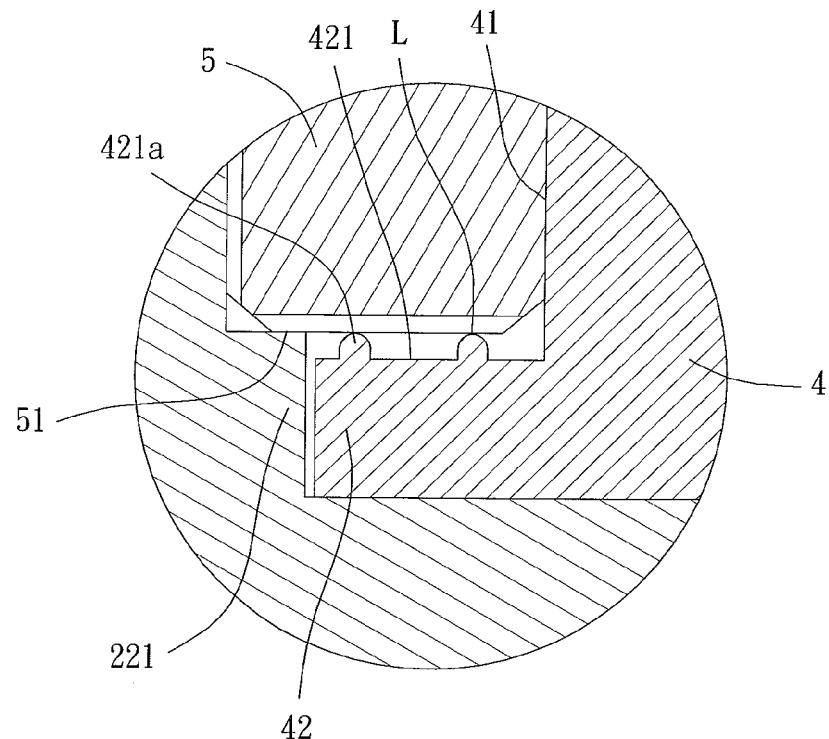
FIG. 5 is a partially-enlarged, cross-sectional view of the motor with the thrust bearing of the preferable embodiment after assembly, with the rotating member including a limiting portion having the annular protrusions.
Figure 6:
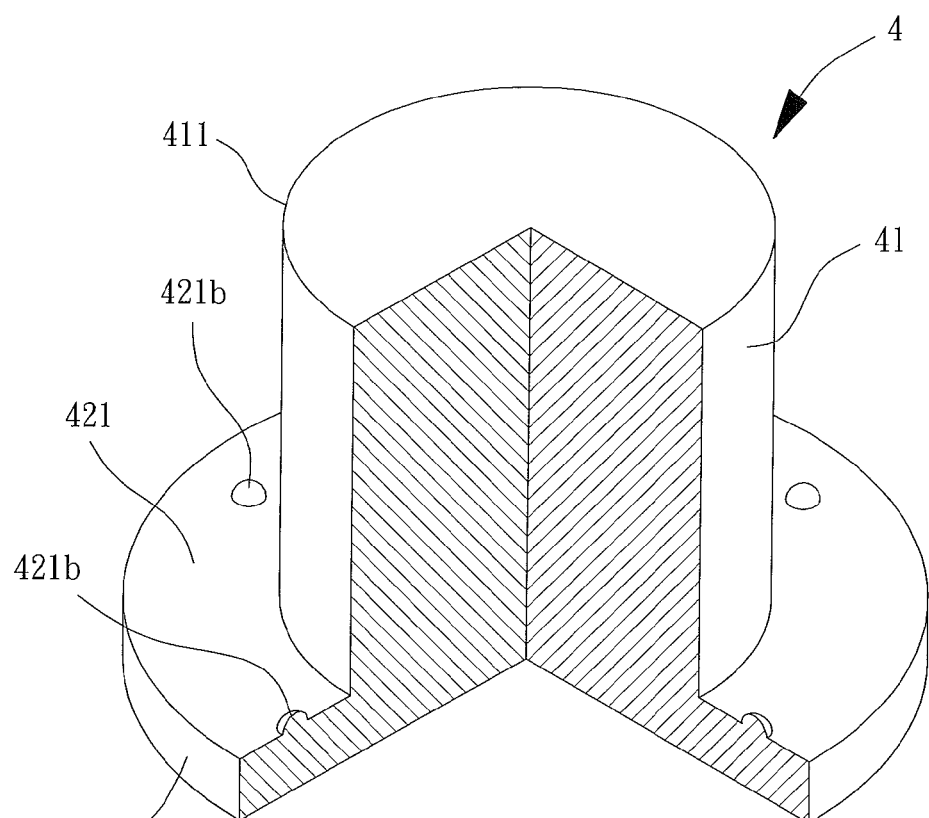
FIG. 6 is a perspective view of a rotating member of the motor with the thrust bearing of the preferable embodiment, with the rotating member including a limiting portion having a plurality of dot protrusions.
Figure 7:
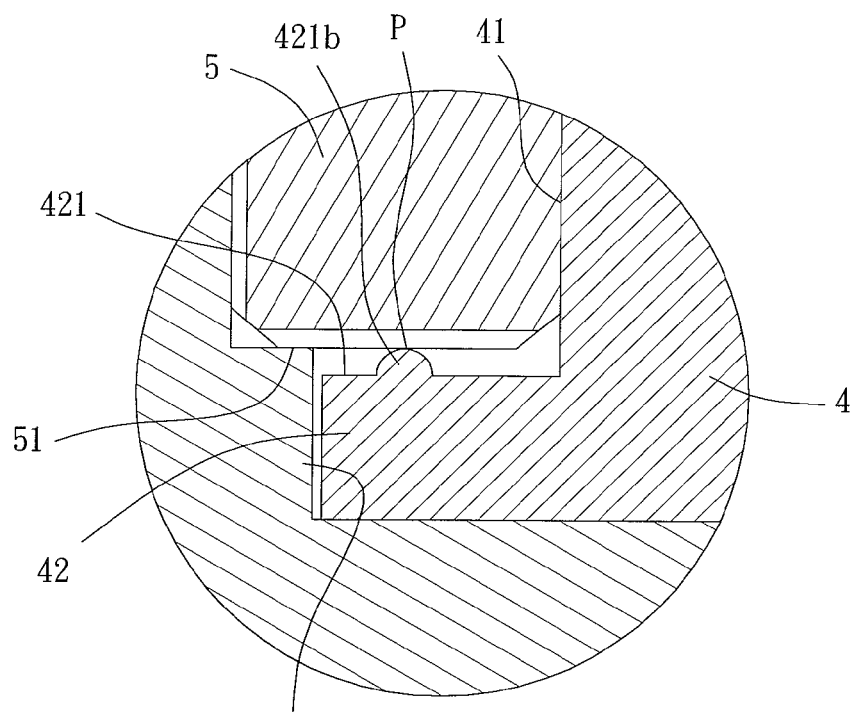
FIG. 7 is a partially-enlarged, cross-sectional view of the motor with the thrust bearing of the preferable embodiment after assembly, with the rotating member including a limiting portion having the dot protrusions.
Figure 8:
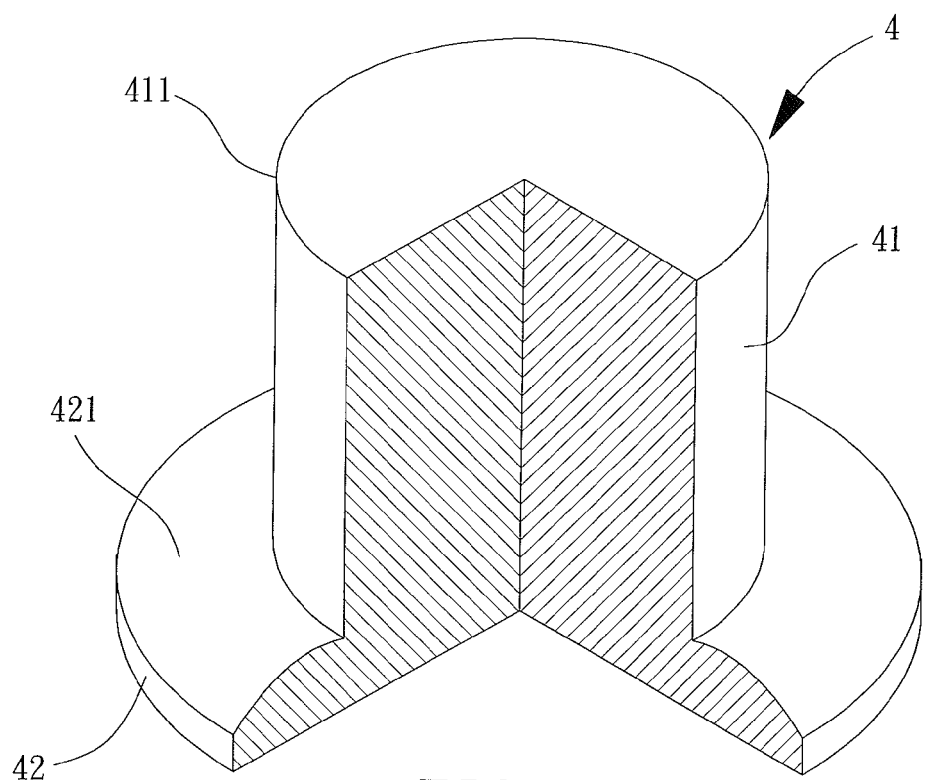
FIG. 8 is a perspective view of a rotating member of the motor with the thrust bearing of the preferable embodiment, with the rotating member including a limiting portion having an arc surface.
Figure 9:
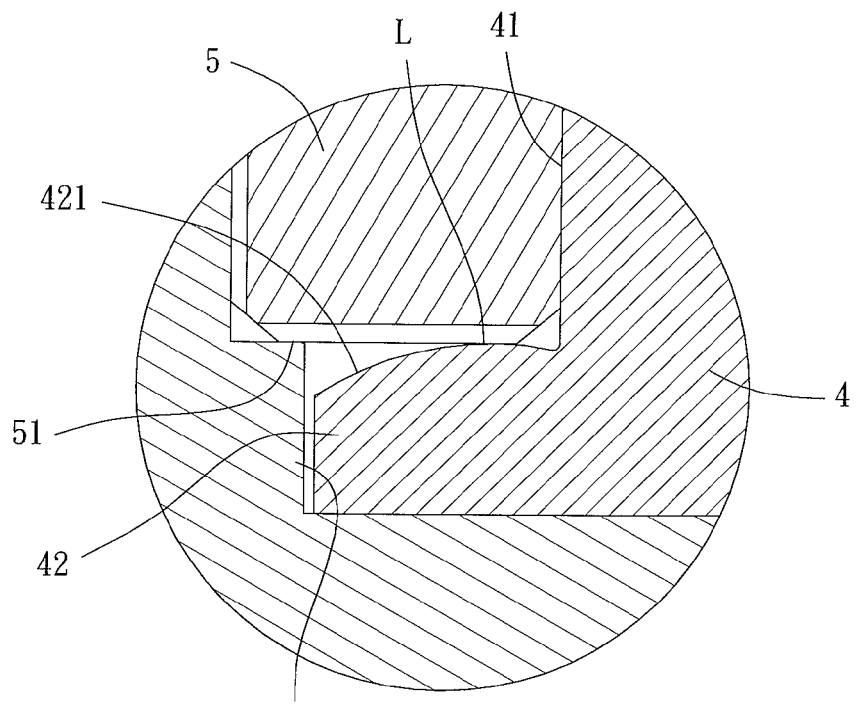
FIG. 9 is a partially-enlarged, cross-sectional view of the motor with the thrust bearing of the preferable embodiment, with the rotating member including a limiting portion having the arc surface.

Specifically, in order to clearly illustrate the situation when the contact between the first and second contact surfaces 421, 51 is in point contact or line contact substantially provided by an uneven surface, examples are discussed as follows. Referring to FIGS. 4 and 5, the uneven surface serving as the first contact surface 421 has a plurality of annular protrusions 421a contacting with the second contact surface 51. Each annular protrusion 421a has an abutting line "L" in a circular shape, which is a free end of the annular protrusion 421a, and the annular protrusion 421a contacts with the second contact surface 51 by this abutting line "L" only. Therefore, the interface area between the first and second contact surfaces 421, 51 is provided by the abutting line "L," which results in a line contact substantially. Similarly, referring to FIGS. 6 and 7, the uneven surface serving as the first contact surface 421 has a plurality of dot protrusions 421b contacting with the second contact surface 51. Each dot protrusion 421b has an abutting point "P," which is a free end of the dot protrusion421b, and the dot protrusion 421b contacts with the second contact surface 51 by this abutting point "P" only. Therefore, the interface area between the first and second contact surfaces 421, 51 is provided by the abutting point "P," which results in a point contact substantially. Furthermore, referring to FIGS. 8 and 9, the uneven surface can also be provided by forming the first contact surface 421 into an arc surface radially extending from the shaft 41 to an outer periphery of the limiting portion 42, to provide the abutting line "L" as well as the line contact by a free end of the arc surface to contact with the second contact surface 51.

Figure 10:
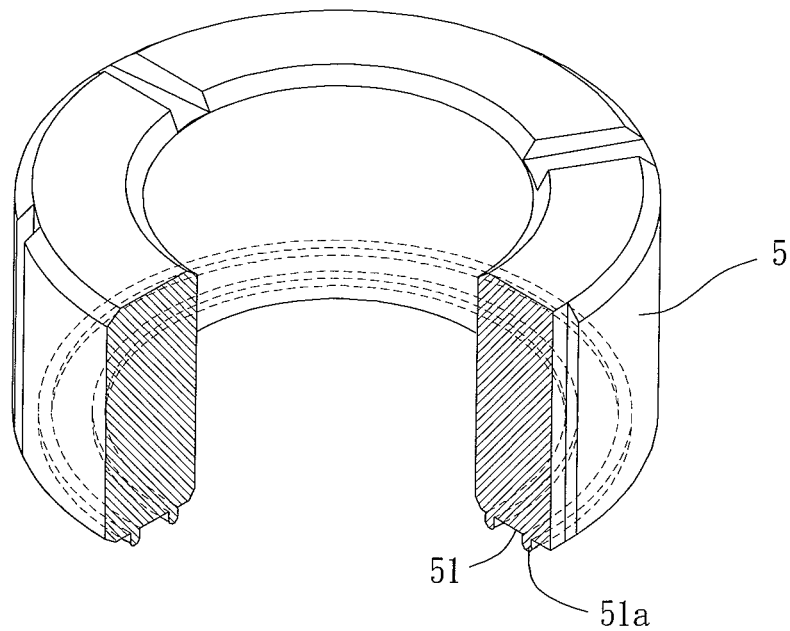
FIG. 10 is a perspective view of a rotating member of the motor with the thrust bearing of the preferable embodiment, with the thrust bearing including a plurality of annular protrusions.
Figure 11:
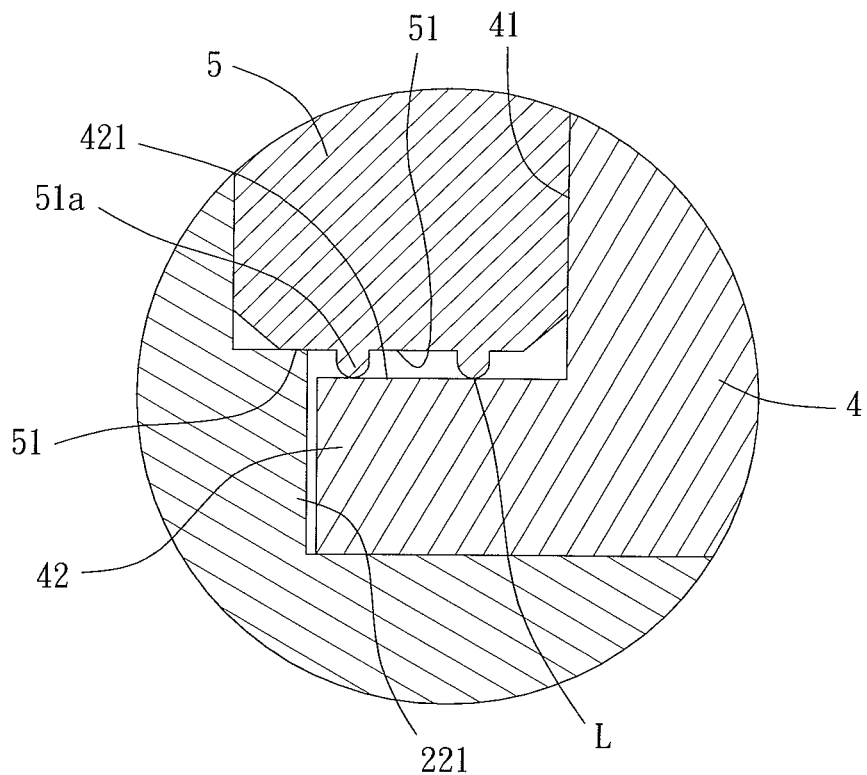
FIG. 11 is a partially-enlarged, cross-sectional view of the motor with the thrust bearing of the preferable embodiment after assembly, with the thrust bearing including the annular protrusions.
Figure 12:
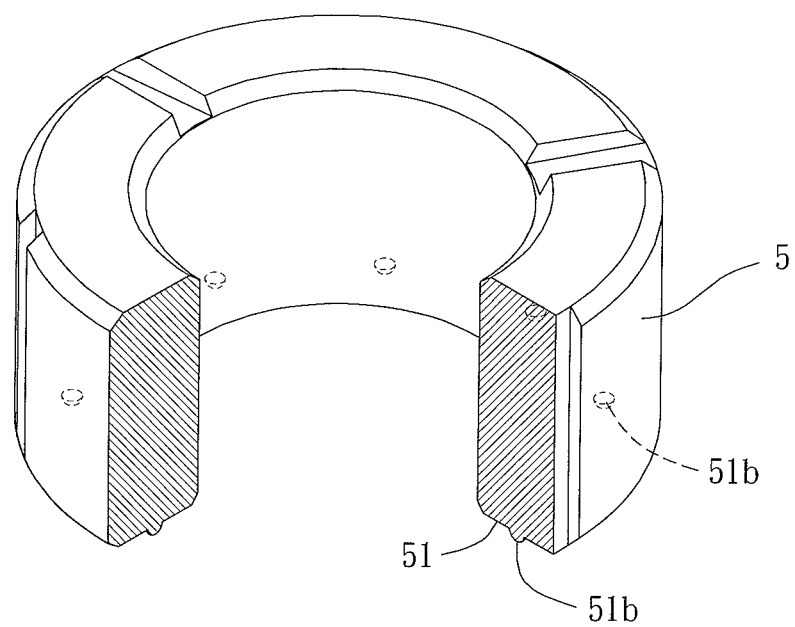
FIG. 12 is a perspective view of a rotating member of the motor with the thrust bearing of the preferable embodiment, with the thrust bearing including a plurality of dot protrusions.
Figure 13:
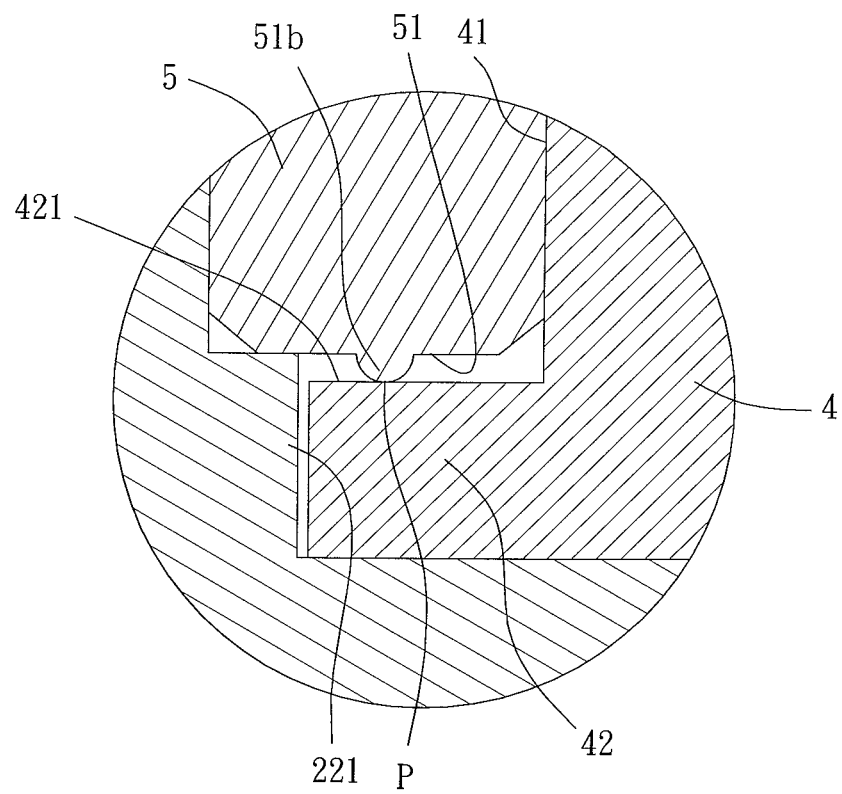
FIG. 13 is a partially-enlarged, cross-sectional view of the motor with the thrust bearing of the preferable embodiment after assembly, with the thrust bearing including the dot protrusions.
Figure 14:
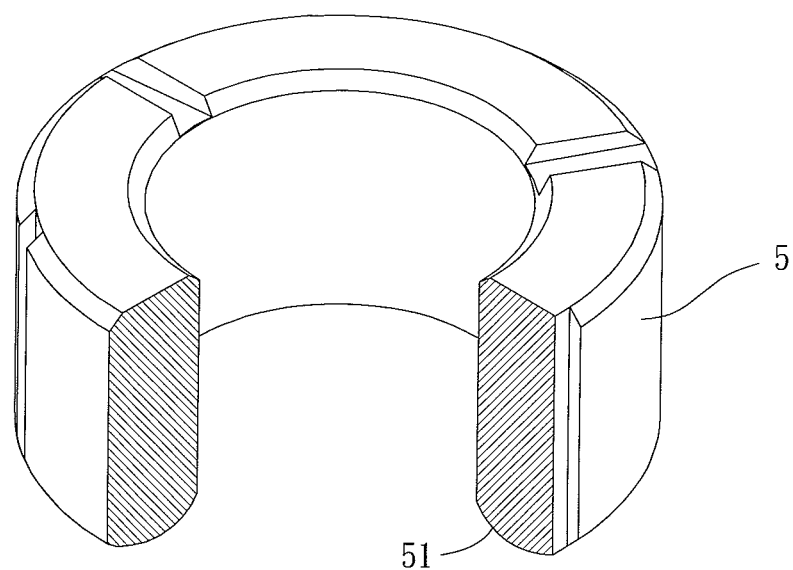
FIG. 14 is a perspective view of a rotating member of the motor with the thrust bearing of the preferable embodiment, with the thrust bearing including an arc surface.
Figure 15:
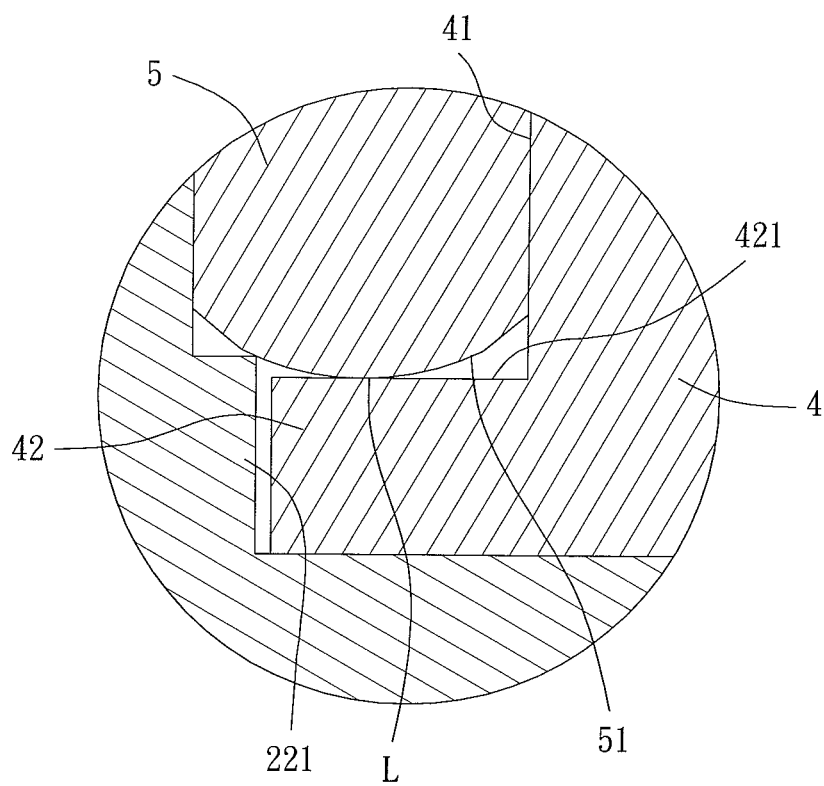
FIG. 15 is a partially-enlarged, cross-sectional view of the motor with the thrust bearing of the preferable embodiment after assembly, with the thrust bearing including the arc surface.
Figure 16:
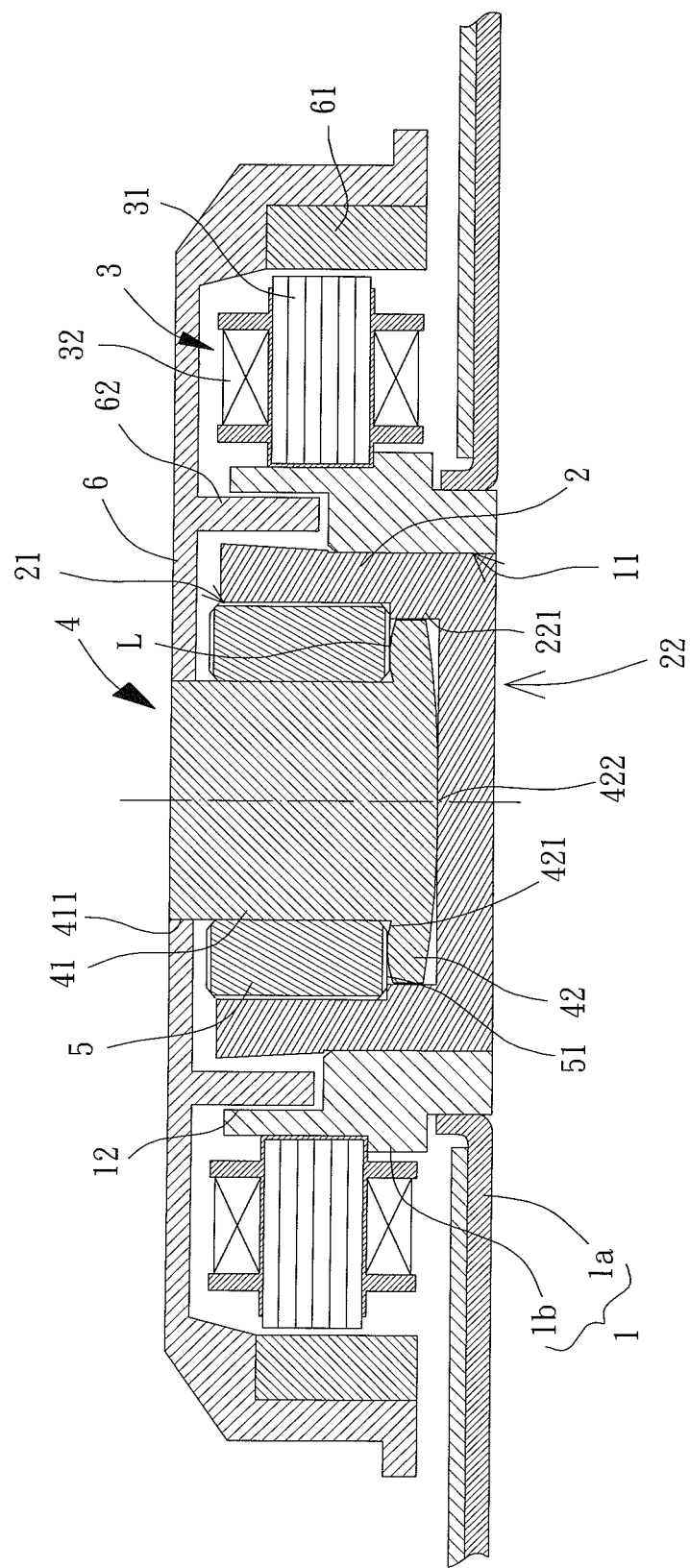
FIG. 16 is a cross-sectional view of the motor with the thrust bearing of the preferable embodiment, with the limiting portion having an arc surface.

Alternatively, instead of the first contact surface 421, the second contact surface 51 may serve as the uneven surface to provide the abutting line "L" or abutting point "P" by having annular protrusions 51a shown in FIGS. 10 and 11, dot protrusions 51b as shown in FIGS. 12 and 13, or an arc surface as shown in FIGS. 14 and 15. Preferably, as shown in FIG. 16, the limiting portion 42 includes an arc surface 422 facing the sealing end 22 of the bearing sleeve 2. Therefore, with the limiting portion 42 abutting against the sealing end 22 by the arc surface 422, the rotating member 4 can smoothly rotate with a small contact area and low friction between the rotating member 4 and the sealing end 22.

The hub 6 can be coupled with the coupling portion 411 of the shaft 41 by a conventional way such as welding, adhesion, screwing, or press-fitting. The hub 6 has a permanent magnet 61 corresponding to the stator 3; Namely, the permanent magnet 61 has a pole surface facing to and spaced from the stator 3. In operation, the hub 6 can be driven to rotate by the magnetic field generated by the stator 3.

Specifically, referring to FIG. 3 again, an inner surface of the tube 1b may have a radial recess 12, and a surface of the hub 6, which faces the bearing sleeve 2, may have an annular flange 62 extending into the tube 1b and corresponding to the radial recess 12. Therefore, the annular flange 62 adjacent to the opening end 21 and located between the radial recess 12 and the bearing sleeve 2 can efficiently achieve functions such as dust-resistance and oil preservation.

Figure 17:
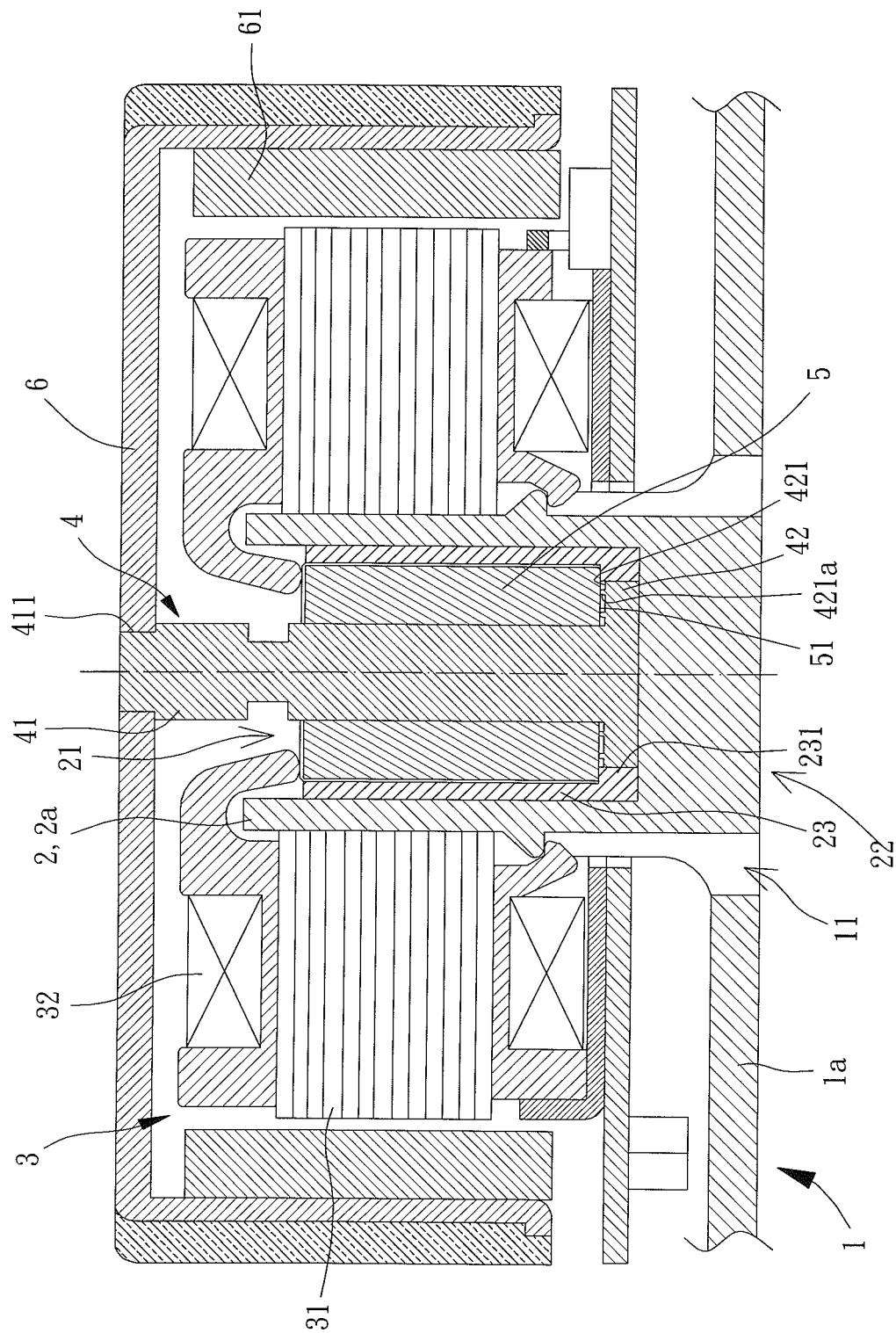
FIG. 17 is a cross-sectional view of the motor with the thrust bearing of the preferable embodiment after assembly, with an inner sleeve arranged inside a bearing sleeve serving as a shaft tube.
Figure 18:
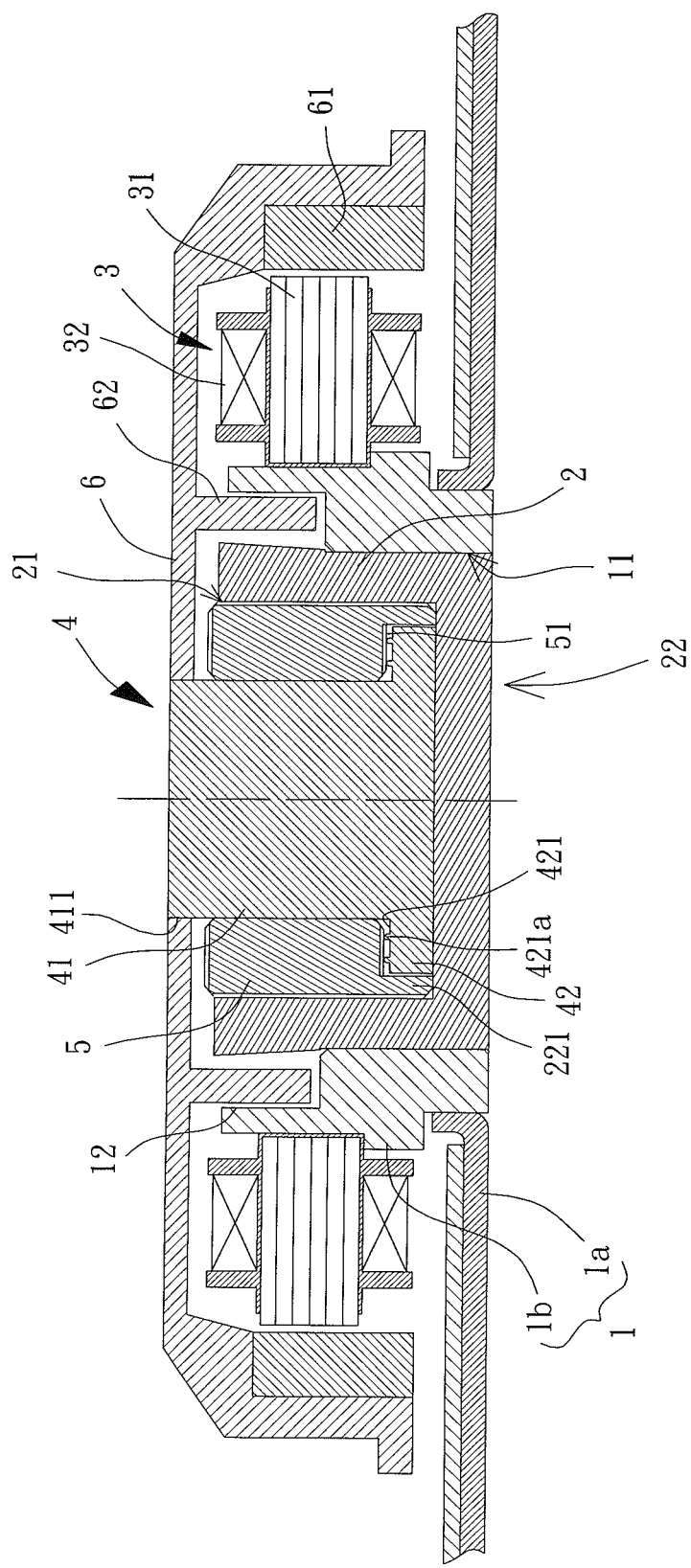
FIG. 18 is a cross-sectional view of the motor with the thrust bearing of the preferable embodiment, with the thrust bearing having a plurality of supports.

Referring to FIG. 17, with the idea of at least one of the first and second contact surfaces 421, 51 being an uneven surface, the base 1 may have the plate 1a only. Furthermore, the bearing sleeve 2 serves as a shaft tube 2a integrally formed with the plate 1a via the connecting portion 11, so that the base 1 and the shaft tube 2a form an one-piece element having a simplified and easy-to-assembling structure. However the shaft tube 2a may connect with the plate 1a detachably. The stator 3 is coupled with an outer surface of the shaft tube 2a. Preferably, there is an inner sleeve 23 inside the shaft tube 2a, with the inner sleeve 23 having a radial protrusion 231 between the thrust bearing 5 and the sealing end 22, to form a gap between the limiting portion 42 and the thrust bearing 5 for decreasing interference therebetween. Specifically, the inner sleeve 23 can also be integrally formed with or detachably affixed to the shaft tube 2a.

In sum, with the above structure that at least one of the first and second contact surfaces 421, 51 is an uneven surface, preferably providing a line contact or point a contact, the rotating member 4 as well as the hub 6 can smoothly rotate since the contact area and friction between the thrust bearing 5 and the limiting portion 42 are largely lowered. As a result, an ideal quality in rotation of the motor is provided.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A motor with a thrust bearing, comprising:
   a base;
   a bearing sleeve arranged with the base and having an opening end and a sealing end, with the opening and the sealing ends opposite to each other;
   a stator coupled with the base or the bearing sleeve;
   a rotating member disposed in in the bearing sleeve and comprising a shaft and a limiting portion, wherein a first end of the shaft connects with the limiting portion, a second end of the shaft has a coupling portion, and the limiting portion has a first contact surface;
   a thrust bearing arranged between the shaft and an inner surface of the bearing sleeve, so that the limiting portion is between the thrust bearing and the sealing end, wherein the thrust bearing has a second contact surface facing the first contact surface, and at least one of the first contact surface and the second contact surface is an uneven surface, wherein an interface between the first contact surface and the second contact surface is point contact; and
   a hub coupled with the coupling portion of the shaft and having a permanent magnet corresponding to the stator.

2. The motor with thrust bearing as claimed in claim 1, wherein the first contact surface has a plurality of dot protrusions contacting with the second contact surface.

3. The motor with thrust bearing as claimed in claim 2, wherein each of the plurality of dot protrusions has an abutting point and contacts with the second contact surface by the abutting point only, to provide the point contact between the first and second contact surfaces.

4. The motor with thrust bearing as claimed in claim 1, wherein the second contact surface has a plurality of dot protrusions contacting with the first contact surface.

5. The motor with thrust bearing as claimed in claim 4, wherein each of the plurality of dot protrusions has an abutting point and contacts with the first contact surface by the abutting point only, to provide the point contact between the first and second contact surfaces.

6. The motor with thrust bearing as claimed in claim 1, wherein the coupling portion is close to the opening end and away from the sealing end as well as the limiting portion is close to the sealing end and away from the opening end.

7. The motor with thrust bearing as claimed in claim 6, wherein the limiting portion has an arc surface facing and abutting against the sealing end of the bearing sleeve.

8. The motor with thrust bearing as claimed in claim 6, wherein a surface of the sealing end inside the bearing sleeve has a plurality of supports, and wherein an end of the thrust bearing abuts against the plurality of supports.

9. The motor with thrust bearing as claimed in claim 6, wherein a surface of the sealing end inside the bearing sleeve has a plurality of supports, and wherein the limiting portion abuts against the plurality of supports.

10. The motor with thrust bearing as claimed in claim 6, wherein a surface of the thrust bearing has a plurality of supports abutting against the sealing end.

11. The motor with thrust bearing as claimed in claim 1, wherein the base has a connecting portion, a plate and a tube, the connecting portion is arranged with the bearing sleeve, the tube is arranged at a center part of the plate and has an axial hole extending through the tube axially, the connecting portion of the base is the axial hole of the tube, and the stator is coupled with an outer periphery of the tube.

12. The motor with thrust bearing as claimed in claim 1, wherein the base has a plate, the bearing sleeve is a shaft tube integrally formed with the plate, and the stator is coupled with an outer surface of the shaft tube.

13. The motor with thrust bearing as claimed in claim 12, wherein the coupling portion is close to the opening end and away from the sealing end as well as the limiting portion is close to the sealing end and away from the opening end, and wherein an inner sleeve is arranged inside the shaft tube and has a radial protrusion between the thrust bearing and the sealing end.

14. The motor with thrust bearing as claimed in claim 13, wherein the inner sleeve is integrally formed with the shaft tube.

15. The motor with thrust bearing as claimed in claim 13, wherein a gap is formed between the limiting portion and the thrust bearing.

16. The motor with thrust bearing as claimed in claim 1, wherein an inner surface of the tube has a radial recess, a surface of the hub has an annular flange extending into the tube and corresponding to the radial recess, and the annular flange is located between the radial recess and the bearing sleeve.

17. The motor with thrust bearing as claimed in claim 1, wherein in radial directions of the rotating member, each of the shaft and the limiting portion has a maximum outer diameter, and wherein the maximum outer diameter of the limiting portion is larger than the maximum outer diameter of the shaft.

18. . The motor with thrust bearing as claimed in claim 1, wherein the base and the bearing sleeve are integrally formed with each other as a single piece.

\* \* \* \* \*